United States Patent [19]
Krautkremer et al.

[11] Patent Number: 6,050,371
[45] Date of Patent: Apr. 18, 2000

[54] UNIT FOR A DRUM BRAKE AND DRUM BRAKE EQUIPPED WITH SAME

[75] Inventors: Hubert Krautkremer, Mülheim-Kärlich; Frank Biebricher, Fachingen; Peter Johannes Ludtke, Remagen; Thanh Duc Chau, Koblenz; Karl-Heinz Jungmann, Neuwied, all of Germany

[73] Assignee: Lucas Industries plc, Germany

[21] Appl. No.: 09/060,699

[22] Filed: Apr. 15, 1998

[30] Foreign Application Priority Data

Apr. 15, 1997 [DE] Germany .......................... 197 15 718

[51] Int. Cl.$^7$ ..................................................... F16D 51/00
[52] U.S. Cl. ..................... 188/79.51; 188/79.54; 188/79.56; 188/106; 188/106 A
[58] Field of Search .......................... 188/79.51, 79.54, 188/79.56, 106, 106 A, 106 P, 340, 341, 250 D, 250 F, 250 B; 411/999, 516, 520, 174

[56] References Cited

U.S. PATENT DOCUMENTS

| | | | |
|---|---|---|---|
| 4,276,966 | 7/1981 | Ayers | 188/79.51 |
| 4,401,195 | 8/1983 | Last | 188/79.51 |
| 4,706,783 | 11/1987 | Rath et al. | 188/79.76 |
| 4,753,327 | 6/1988 | Shellhause | 188/216 |
| 5,271,488 | 12/1993 | Cooke et al. | 192/107 C |

FOREIGN PATENT DOCUMENTS

| | | |
|---|---|---|
| 0 575 825 | 12/1993 | European Pat. Off. . |
| 25 08 614 | 8/1975 | Germany . |

*Primary Examiner*—Christopher P. Schwartz
*Assistant Examiner*—Devon Kramer
*Attorney, Agent, or Firm*—MacMillan, Sobanski & Todd, LLC

[57] ABSTRACT

A structural unit for a drum brake comprises at least one brake shoe (12) and an adjusting device (32) which comprises an adjusting strut (34), a ratchet-detent wheel mechanism and an adjusting lever (40) which comprises the ratchet (52). The brake shoe (12) has a web (22) against which the adjusting strut (34) rests and on which the adjusting lever (40) is pivotably mounted by means of a bearing pin (56). In order to enable the structural unit with the adjusting device (32) to be easily retrofitted also in the case of older drum brakes the bearing pin (56) is attached to a separate carrier member (66) which can be slid onto the web (22) of the brake shoe (12) in a clamping manner and which comprises at least one first offset (84) which positively engages a recess (86) provided in the web (22). In this manner, the bearing pin (56) is reliably and true-to-position secured at the brake shoe web (22).

20 Claims, 6 Drawing Sheets

UNIT FOR A DRUM BRAKE AND DRUM BRAKE EQUIPPED WITH SAME

The invention relates to a structural unit for a drum brake, with the structural unit comprising at least one brake shoe and one adjusting device which includes an adjusting strut, a ratchet-detent wheel mechanism and an adjusting lever which comprises the ratchet, and wherein the brake shoe comprises a web against which the adjusting strut rests and at which the adjusting lever is pivotably mounted by means of a bearing pin.

DE 25 08 614 C2 already describes a drum brake with an automatic adjusting device for lining wear compensation which includes such a structural unit. In the automatic adjusting device according to DE 25 08 614 C2 an adjusting strut with adjustable length is arranged between one of the brake shoes and a mechanical actuating lever of the where the strut is kept in abutment with the other brake shoe by means of spring fore action. An adjusting lever is pivotably mounted at the one brake shoe and engages a detent wheel which is rotatably mounted on the adjusting strut, whose rotation adjusts the length of the adjusting strut in a lining wear-compensating sense. The adjusting lever is formed as a two-arm lever whose one arm carries the ratchet and whose other arm is permanently axially biased against the adjusting lever side of the strut by means of a spring. In the following the state of the art according to DE 25 08 614 C2 is assumed to be known.

A similar drum brake which also includes the initially described structural unit is known from EP 0 575 825 B1. There, the adjusting lever is formed, at least partially, as a bimetal member in order to prevent an excessive lining adjustment which can occur with conventional drum brakes due to a heat expansion of the brake under operating conditions.

In order to enable an adjusting device of the described type to function in a drum brake, a bearing location for the adjusting lever is required. Generally, i.e. also in the case of the two previously described drum brakes which are known from the state of the art, this bearing location is formed by a pin or a sleeve which is pressed into a corresponding recess in the brake shoe web. Subsequently, i.e. with an already supplied and operating drum brake, such a bearing location can only be retrofitted with considerable effort, more so because the bearing location cannot be arranged randomly but must be arranged at a precisely defined location. Generally, drum brakes have, to date, therefore not been retrofitted with an adjusting device.

The invention is based on the object to provide a solution through which a drum brake can be easily and economically and first of all subsequently provided with an adjustment device for compensating the brake lining wear without requiring that decision as early as during the production of the drum brake and in particular of its brake shoes.

Starting from a generic structural unit this object is solved according to the invention in that the bearing pin for the adjusting lever is attached to a separate carrier member which can be slid onto the web of the brake shoe in a clamping manner and which at least comprises a first offset which is in positive engagement with a recess provided in the web. According to the invention it is thus no longer necessary to provide a recess for the bearing pin in the brake shoe web and a press fitted bearing pin, but the bearing pin is provided, if required, by simply sliding the separate carrier member onto the brake shoe web. The clamping fit of the carrier member in conjunction with the offset which is in positive engagement with a recess already provided in the brake shoe web ensures a reliable and primarily true-to-position attachment of the bearing pin. The invention takes advantage of the fact that several openings are always provided in the brake shoe web which is also referred to as web plate. These serve, for example, for hooking in brake shoe return springs, for attaching a brake shoe holding down device and the like. The first offset of the separate carrier member to which the bearing pin is attached according to the invention positively engages one of these openings or recesses, respectively, and thus ensures an immovable fit of the carrier member and consequently of the bearing pin in a desired precisely specified position. The first offset preferably engages a recess of the brake shoe web which is located near the desired position for the bearing pin in order to maintain small dimensions of the carrier member.

The carrier member of the structural unit according to the invention preferably comprises a plate-shaped base which rests extensively on the brake shoe web and from which the bearing pin projects at a right angle to the brake shoe web and away from same. The bearing pin can, for example, be connected with the plate-shaped base in a material-bond manner by welding etc., but the plate-shaped base can also be provided with an opening which accommodates the bearing pin preferably with a press fit. The plate-shaped base is at least essentially flat.

According to a preferred embodiment the plate-shaped base is formed, about an opening for the bearing pin, from the plane of the base and away from the brake shoe web as a truncated cone, the diameter of the opening being slightly smaller than the diameter of the bearing pin. The bearing pin is designed as a separate part with a slightly enlarged foot, which is pressed from the side of the carrier member facing the brake shoe web through the opening until the enlarged foot abuts the truncated cone-shaped form. The truncated cone-shaped form enables on the one hand the accommodation of the enlarged foot of the bearing pin and on the other hand the relatively easy press fit of the bearing pin with the slightly larger diameter, with the bearing pin being absolutely reliably connected with the carrier member when press-fitted due to a certain resilience of the truncated cone-shaped form.

According to a preferred modification of the previously described embodiment the bearing pin is constituted by a commercially available hollow steel rivet whose foot is arranged below the truncated cone-shaped form and in the plane of the plate-shaped base. In this manner the bearing pin which is connected with the carrier member bears directly upon the brake shoe web. It is understood that such a support can also be achieved in the previously described embodiment by a corresponding configuration of the enlarged foot.

In all of the previously described embodiments of the structural unit according to the invention the carrier member preferably comprises a U-shaped section connected with the plate-shaped base, which can be slid onto the brake shoe web and by means of which the clamping fit of the carrier member is achieved. Although the carrier member can comprise several offsets which positively engage various recesses of the brake shoe web, the mentioned first offset is sufficient for a true-to-position and reliable attachment of the carrier member at the brake shoe web, in particular if it is arranged remote from the previously mentioned U-shaped section.

The clamping effect of the U-shaped section is preferably obtained by two legs which extend in the same direction and are approximately parallel to each other whose distance from each other in the area of the free end(s) of the legs is smaller than the thickness of the brake shoe web. The legs need not be of the same length but can readily have different lengths. According to a modification one of the two legs is part of the plate-shaped base of the carrier member, i.e. a portion of the plate-shaped base or an extension of same is utilized as a leg.

In preferred embodiments of the structural unit according to the invention the carrier member comprises a second offset which is directed in the opposite sense of the first offset and which serves to support the adjusting strut in an essentially radial direction of the drum brake. In a modification a third offset is provided at the carrier member which extends in the same sense as the second offset and is arranged adjacent to same in such a manner that the second offset supports the adjusting strut at a radially inner position and the third offset supports the adjusting strut at a radially outer position. In this manner, the adjusting strut is guided between the second and the third offset. Supporting the adjusting strut in particular at a radially inner position prevents a displacement of the adjusting strut in this direction which may occur, for example, if the adjusting device no longer functions due to heavy contamination. The effective length of the adjusting device between the two brake shoes of the drum brake then no longer increases in spite of an increasing lining wear, and the sting device can then travel radially inwards towards the center of the drum brake because of the gradually increasing distance between the brake shoes so that the support of the brake shoes in the non-actuated condition of the brake is no longer ensured as intended.

In all the previously mentioned embodiments the carrier member is preferably made from a spring-grade steel. With the exception of the bearing pin it is preferably formed as an integral sheet metal formed part with all its offsets, geometric features, and legs.

Although this has not yet been mentioned, it is understood that generally a certain carrier member can be used only for a certain drum brake or a certain brake shoe, respectively. For retrofitting an adjusting device into another drum brake, however, it is generally only necessary to correspondingly adapt the economically to manufacture carrier member, in particular with respect to the position of the bearing pin and the positively engaging first offset.

Although it is possible to readily retrofit drum brakes comprising an adjusting device for lining wear compensation with a structural unit according to the invention, the inventive method of providing a bearing pin can also be readily employed in the manufacture of new drum brakes which are to be initially equipped with an adjusting device. Due to the fact that the brake shoe itself need not have a bearing location, one and the same brake shoe can be employed both for drum brakes with an adjusting device and for drum brakes without an adjusting device with the resulting advantages in manufacture and stockkeeping.

Structural units according to the invention are also marketed as so-called repair kits. The drum brake structural unit according to the invention then usually comprises a second brake shoe, and two brake shoe return springs extend between the two brake shoes. Such a repair kit is required, for example, if the friction linings which are provided on the brake shoes are worn. The drum brake structural unit according to the invention then replaces the corresponding worn or aged parts of the drum brake, whereby retrofitting an adjusting device is simultaneously possible.

An embodiment of a drum brake structural unit according to the invention as well as a drum brake equipped with same will be explained in the following in more detail with reference to the accompanying drawings in which.

Figure 1:
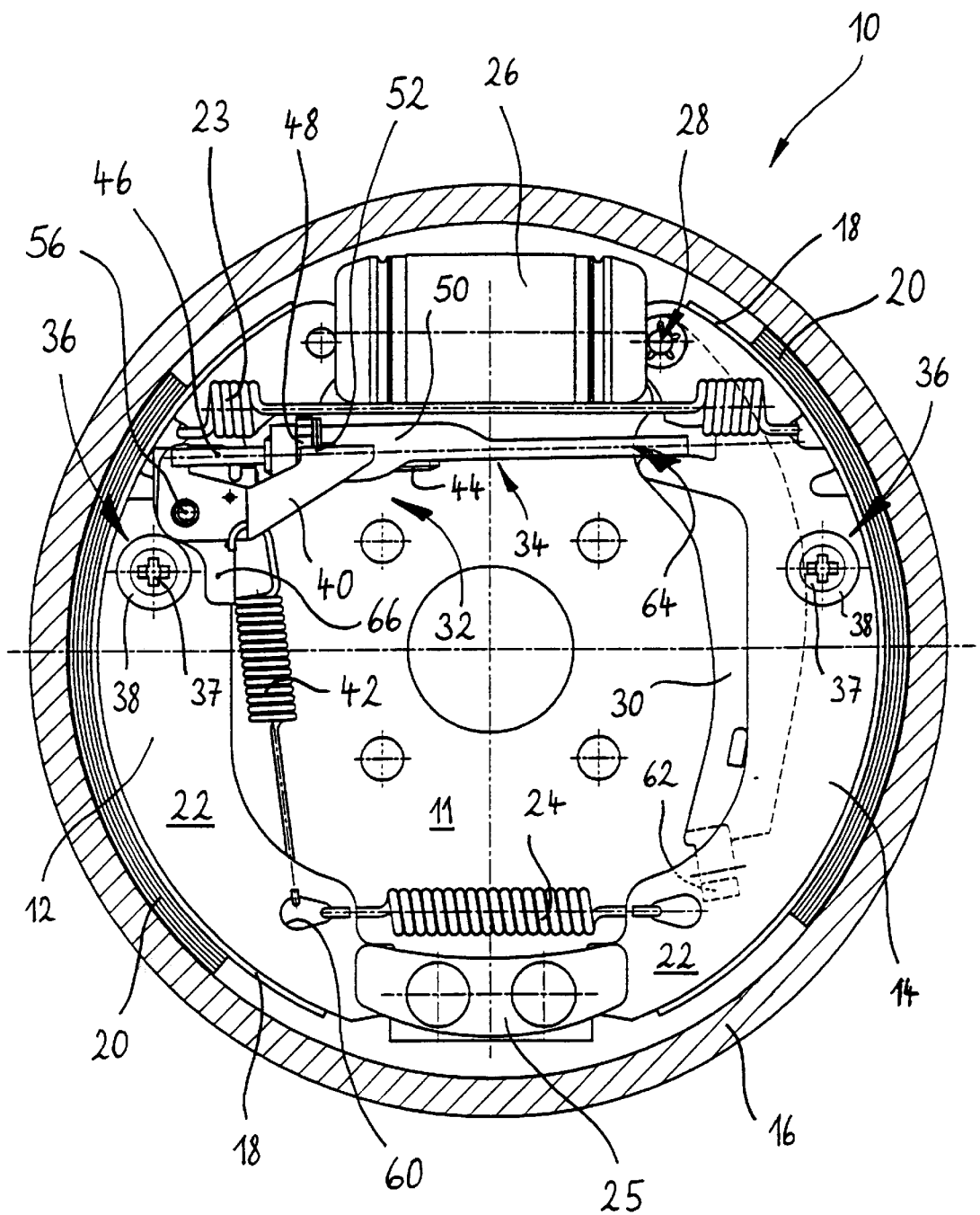
FIG. 1 shows a partially sectioned plan view of a drum brake with a structural unit according to the invention.

The drum brake 10 shown in FIG. 1 has an anchor plate 11 which is provided for attachment at the axle of a motor vehicle, as well as two brake shoes 12 and 14 which are guided at the anchor plate 11 to be movable in such a manner that they can be applied to a brake drum 16. Each of the brake shoes 12, 14 comprises a circular arc-shaped sheet metal lining base 18 on which a friction lining 20 is attached and a web 22 attached to the sheet metal lining base 18 and arranged parallel to the anchor plate 11. Two brake shoe return springs 23 and 24 which bias the brake shoes 12 and 14 towards each other and away from the brake drum 16 extend between the two brake shoes 12 and 14. The forces exerted by the brake shoe return spring 24 onto the brake shoes 12, 14 are introduced into the anchor plate 11 via a counterbearing 25 attached to the anchor plate 11. By means of a hydraulic wheel brake cylinder 26 the brake shoes 12 and 14 can be urged against the force of the brake shoe return springs 23 and 24 away from each other so as to be applied to the brake drum 16. For the exclusively mechanical actuation of the drum brake, for example when using it as a parking brake, an actuating lever 30 is supported at 28 at the brake shoe 14, which urges against the other brake shoe 12 via an adjusting strut 34 which is associated with an adjusting device 32.

Each of the two brake shoes 12 and 14 is held in contact with the anchor plate 11 by means of a brake shoe holding down device 36 of conventional design (here essentially consisting of one holding down pin 37 each, one spring disk 38 and one coil spring arranged below same, which is not visible in FIG. 1).

Figure 5:
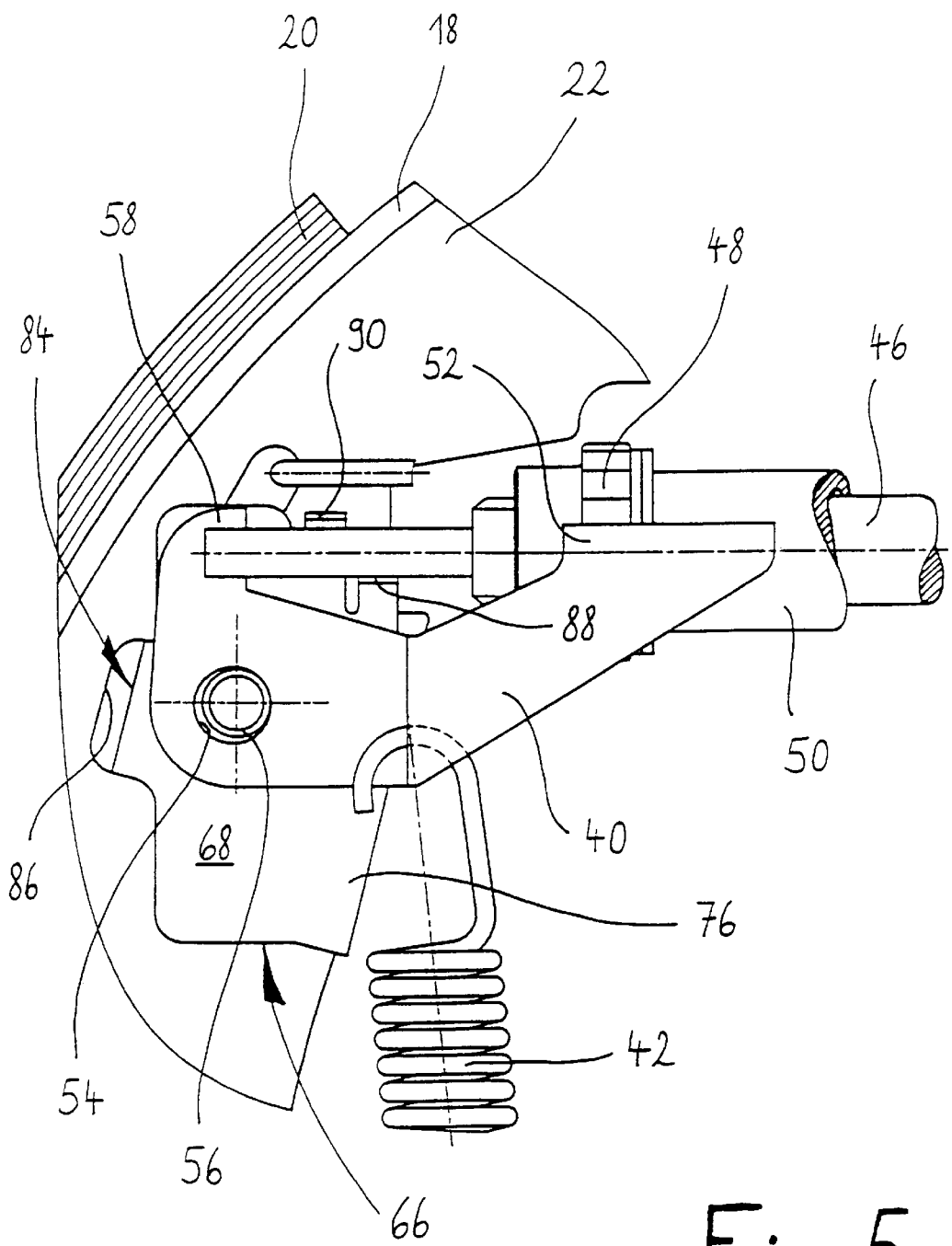
FIG. 5 shows a view similar to that of FIG. 2A but with the adjusting device installed.

The adjusting device 32 arranged between the two brake shoes 12 and 14 comprises the already mentioned adjusting strut 34 which with its fork-shaped ends bears upon the web 22 of the brake shoe 12 or upon the actuating lever 30, respectively, an adjusting lever 40, and an adjusting spring 42 which biases the latter. The adjusting strut 34 consists of a pressure rod 46 provided with a thread 44, a locking or detent wheel 48 (also referred to as adjusting pinion) which is rotatable on the thread 44 of the pressure rod 46, and a pressure sleeve 50. The adjusting lever 40 the shape of which is more readily apparent from FIG. 5, is formed as a two-arm lever with a ratchet 52 being provided at the free end of its longer arm for engagement with the detent wheel 48. The adjusting lever 40 is provided with an eye 54 (see FIG. 5) at its base, through which the bearing pin extends which will later be explained in more detail. As can be seen from FIG. 1 and in particular from FIG. 5 the adjusting lever 40 is thereby rotatably supported on the pin 56.

The shorter arm of the adjusting lever 40 has an end section 58 which engages a gap (see FIGS. 1, 5) between the web 22 of the brake shoe 12 and the fork-shaped end of the pressure rod 46. The adjusting spring 42 whose one end is hooked into the adjusting lever 40 and whose other end is hooked into a recess 60 in the web 22 of the brake shoe 12 (see FIG. 1) biases the rotatably supported adjusting lever 40 in a clockwise direction (relative to FIG. 1) so that the ratchet 42 can exert a downwardly acting force (relative to FIG. 1) on the detent wheel 48.

In the following the function of the adjusting device will be explained in more detail. First, a mechanical usually manual actuation of the shown drum brake by means of the actuating lever 30 will be discussed. If a brake cable (not shown) which is connected with a hand brake lever (not shown) and whose end is hooked into a brake cable receptacle 62 is pulled to the left in FIG. 1, the actuating lever 30 swivels clockwise about its bearing 28 and thereby urges the brake shoe 12 via the adjusting strut 34 against the brake drum 16. The actuating lever 30 then swivels about a contact point 64 at the adjusting strut 34 or the pressure rod 46, respectively, and thereby urges the r.h. brake shoe 14 in FIG. 1 via its bearing 28 against the brake drum 16. The braking torque is introduced via the counterbearing 25 into the anchor plate 11 and from there into the vehicle axle not shown herein. After a release of the brake the brake shoe return springs 23, 24 pull the brake shoes 12 and 14 back into their rest position in which the friction linings 20 are not in engagement with the brake drum 16.

Upon a hydraulic actuation of the drum brake pistons (not shown) of the wheel brake cylinder 26 urge the brake shoes 12, 14 against the brake drum 16. The adjusting strut 34 is thereby relieved so that the resiliently biased adjusting lever 40 can rotate the detent wheel 48 slightly downwards (relative to FIG. 1) by means of its ratchet 52 if the braking clearance has exceeded a certain dimension due to friction lining wear. The rotation of the detent wheel 48 on the thread 44 of the pressure rod 46 then causes an extension of the adjusting strut 34. Upon the release of the drum brake the l.h. end (FIG. 1) of the adjusting strut 34 exerts a pressure on the short arm of the adjusting lever 40 so that same rotates slightly in a counterclockwise sense whereby the ratchet 52 at the long arm of the adjusting lever 40 climbs the flank of that tooth of the detent wheel 48 which is just in engagement with the ratchet 52 and eventually leaps over its tooth tip in order to come into engagement behind the next tooth flank. The adjusting device 32 is now ready for a new adjusting operation.

The bearing pin 56 and its arrangement at the brake shoe 12 will now be described in more detail with reference to FIGS. 2A to 2D. Contrary to conventional designs the present bearing pin 56 is not press fitted into a hole which is punched into the web 22 of the brake shoe 12 but is attached to a separate carrier member 66 which is slid in a clamping manner onto the web 22 of the brake shoe 12.

Figure 3:
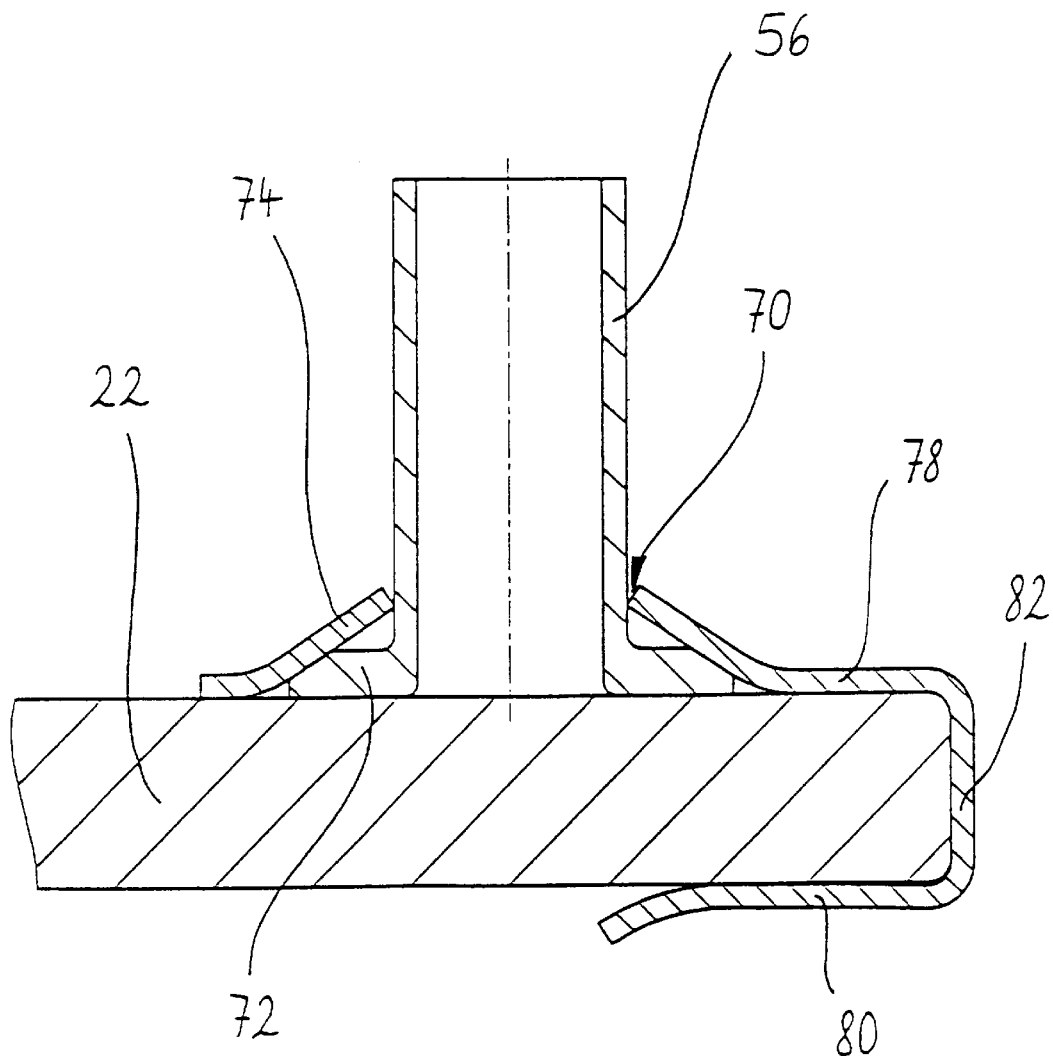
FIG. 3 shows a greatly enlarged section similar to that in FIG. 2C.

The carrier member 66 has a plate-shaped base 68 with a round opening 70 (see FIG. 3) which accommodates the bearing pin 56. The plate-shaped base 68 is essentially plane and, as shown, rests extensively on the brake shoe web 22, while the bearing pin 56 extends at right angle to the base 68 and thus towards the web 22 and bears upon the web 22 by means of the base 68.

In the illustrated embodiment the bearing pin 56 is constituted by a commercially available hollow steel rivet with an enlarged foot 72. For the accommation of this foot 72 the plate-shaped base 68 of the carrier member 66 is formed about the opening 70 as shown at 74 in the figures off the plane of the base 68 in a truncated cone style away from the brake shoe web 22. The diameter of the opening 70 is slightly smaller than the outer diameter of the bearing pin 56 so that after its insertion through the hole 70 the hollow steel rivet forming the bearing pin 56 is held by a press fit in the base 68, which is even enhanced by a certain resilience effect of the truncated cone-shaped form 74. The size of the form 74 is selected in such a manner that the foot 72 of the hollow steel rivet is completely accommodated in the form 74 and its surface facing the web 22 is located in one plane with the adjacent surface of the plate-shaped base 68. In this manner the bearing pin 56 also rests directly upon the web 22 of the brake shoe 12 via its foot 72 (see also FIG. 3).

For the clamping attachment of the carrier member 66 to the web 22 of the brake shoe 12 the former has a U-shaped section 76 which is integrally connected with the plate-shaped base 68 and which comprises two legs 78 and 80 which extend in the same direction and are approximately parallel to each other. The two legs 78 and 80 are connected with each other by means of a base piece 82 which extends at right angles to them. In the area of their free ends the distance between the two legs 78, 80 is smaller than the thickness of the web 22 if the carrier member 66 is not slid onto the web 22. When slid onto the web 22, the two resilient legs 78 and 80 are slightly forced apart and exert a clamping force on the web 22.

In order to have the bearing pin 56 assume a predetermined, accurately defined position the carrier member 66, on the one hand, is slid onto the web 22 until the base piece 82 of the U-shaped section 76 which connects the two legs 78 and 80 abuts against the edge of the web 22. On the other hand, the carrier member 66 comprises at least one offset 84 (see FIG. 2B) which extends from its base 68 at right angles towards the brake shoe web 22 and which positively engages a recess 86 in the web 22 when the carrier member 66 has been fully slid onto the web 22. The offset 84 is dimensioned in such a manner that a displacement of the carrier member 66 after the positive engagement of the offset 84 with the recess 86 is no longer possible. In this manner the carrier member 66 is secured true to position and virtually immovably at the brake shoe web 22 by means of the U-shaped section 76 and the first offset 84. If the carrier member 66 has only one offset 84 this should be arranged remote from the U-shaped section 76 in order to achieve a secure and non-rotatable attachment of the carrier member 66.

Figure 4A:
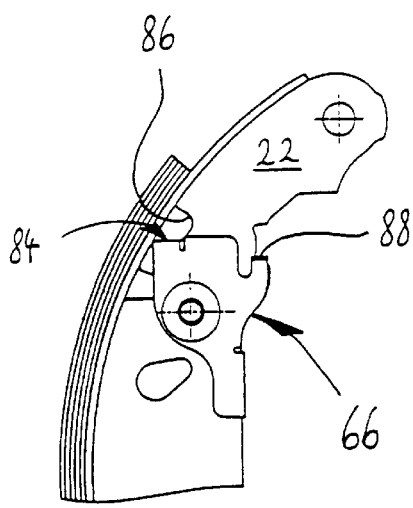
FIGS. 4A to 4D show views similar to those of FIG. 2A but with modified embodiments of the carrier member.
Figure 4B:
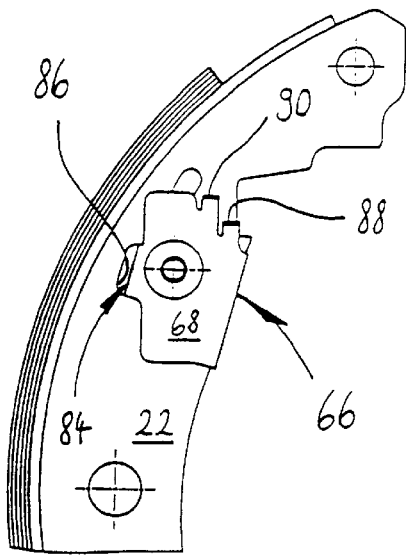
Figure 4C:
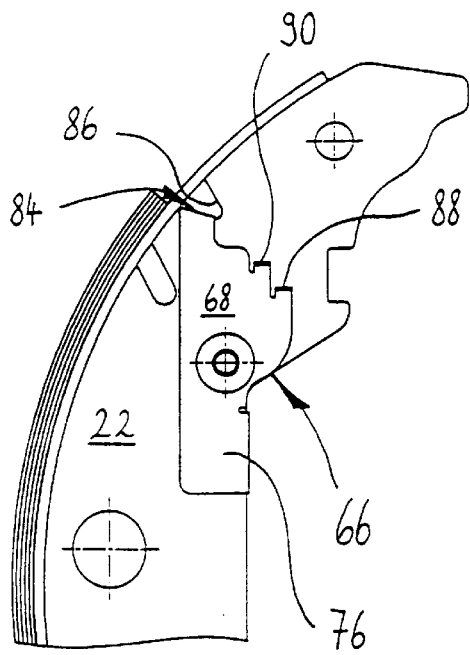
Figure 4D:
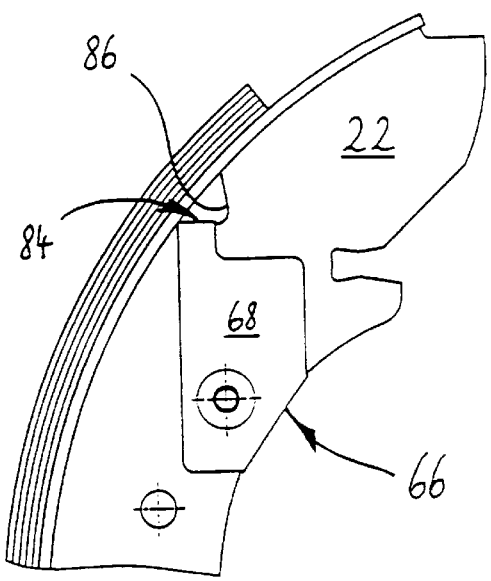

The illustrated position of the recess 86 in the brake shoe web 22 represents an example only. The exact position of this recess 86 is not decisive; rather, any other recess in the brake shoe web 22 near the position of the bearing pin 56, which is already available and not required otherwise, can be utilized for the positive engagement of the first offset 84. FIGS. 4A to 4D show examples corresponding to modified carrier members 66. FIGS. 4B and 4D show embodiments where the U-shaped section 76 is integrated into the plate-shaped base 68, i.e. the leg 78 shown uppermost in the figures of the U-shaped section 76 is completely formed by the plate-shaped base 68.

Figure 2A:
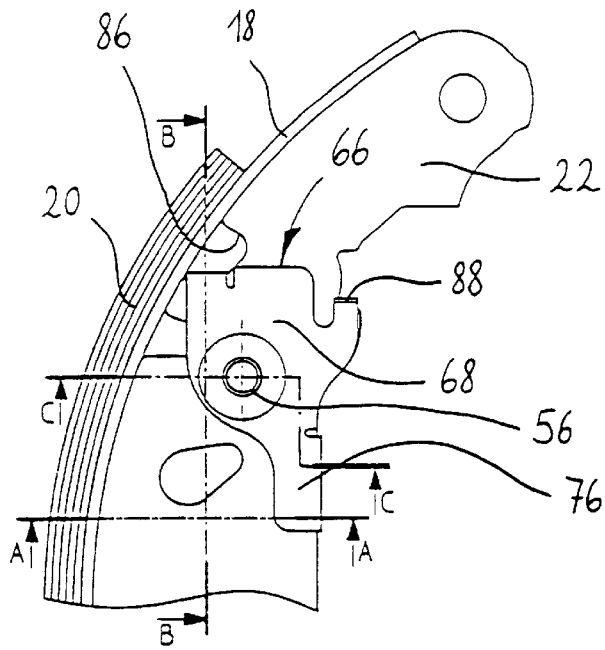
FIG. 2A shows an enlarged representation of the upper part of the l.h. brake shoe from FIG. 1 with the carrier member installed.
Figure 2B:
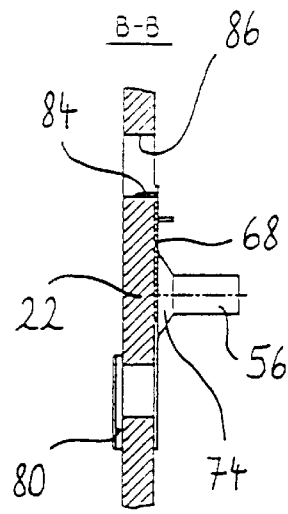
FIG. 2B shows the section B—B from FIG. 2A.
Figure 2C:
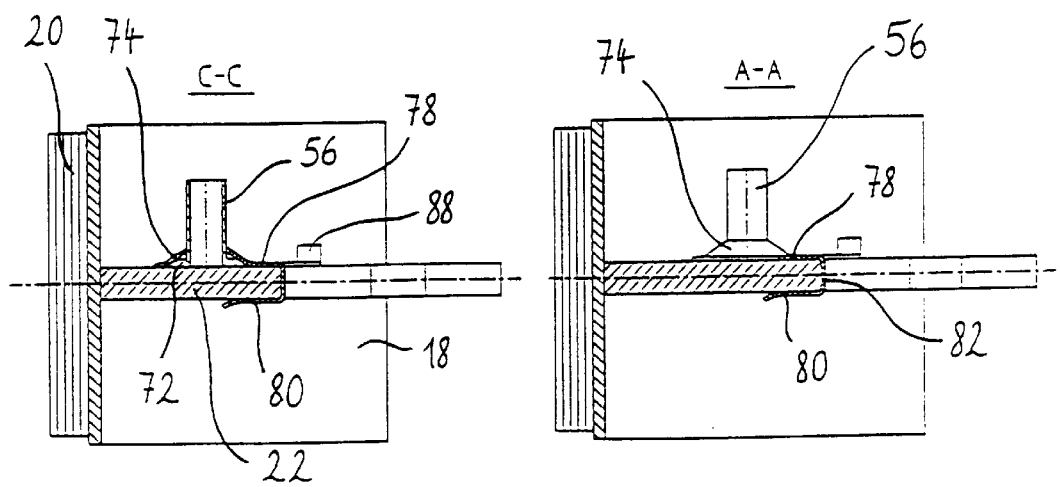
FIG. 2C shows the section C—C from FIG. 2A.
Figure 2D:
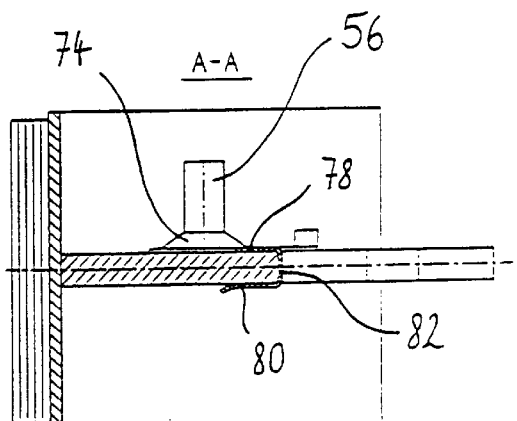
FIG. 2D shows the section A—A from FIG. 2A.

In addition to the first offset 84 the carrier member 66 can comprise a second offset 88 which is directed in an opposite direction to the first offset (see FIG. 2A). This second offset 88 serves as a support for the adjusting strut 34 in an essentially radial direction of the drum brake and prevents, for example, a radial displacement of the adjusting strut 34 towards the center of the drum brake if the adjusting device 32 no longer functions properly due to heavy contamination, i.e. if the length of the adjusting strut 34 no longer increases in spite of an increasing wear of the friction linings 20. If the adjusting strut 34 is no longer adequately secured against a radial displacement in the brake shoe webs 22 themselves, the adjusting strut 34 can travel towards the inside, i.e. towards the center of the drum brake due to the increasing distance between the two brake shoes 12 and 14, so that the function of the drum brake can be impaired.

In addition to the second offset 88 a third offset 90 can be provided adjacent to same and directed in the same sense at the carrier member 66 in such a manner that the second offset 88 supports the adjusting strut 34 against a radially inward displacement and the third offset 90 supports the adjusting strut 34 against a radially outward displacement. FIGS. 4B and 4C show carrier members 66 with second and third offsets 88 or 90, respectively. Corresponding to the first offset 84, the second offset 88 and the third offset 90 are bent or bevelled, respectively, at right angles off the plate-shaped base 68 of the carrier member 66.

FIG. 5 shows a carrier member 66 according to FIG. 4B with an adjusting lever 40 supported thereon and an installed adjusting device. It can clearly be seen how the pressure rod 46 is guided both against an inward radial displacement and an outward radial displacement between the second offset 88 and the third offset 90.

In the described embodiments and as can be seen from the figures the carrier member 66, with the exception of the bearing pin 56, is formed as an integral component and consists of spring-grade steel. Other metals or correspondingly tough plastic materials are also feasible as material for the carrier member 66.

Figure 6:
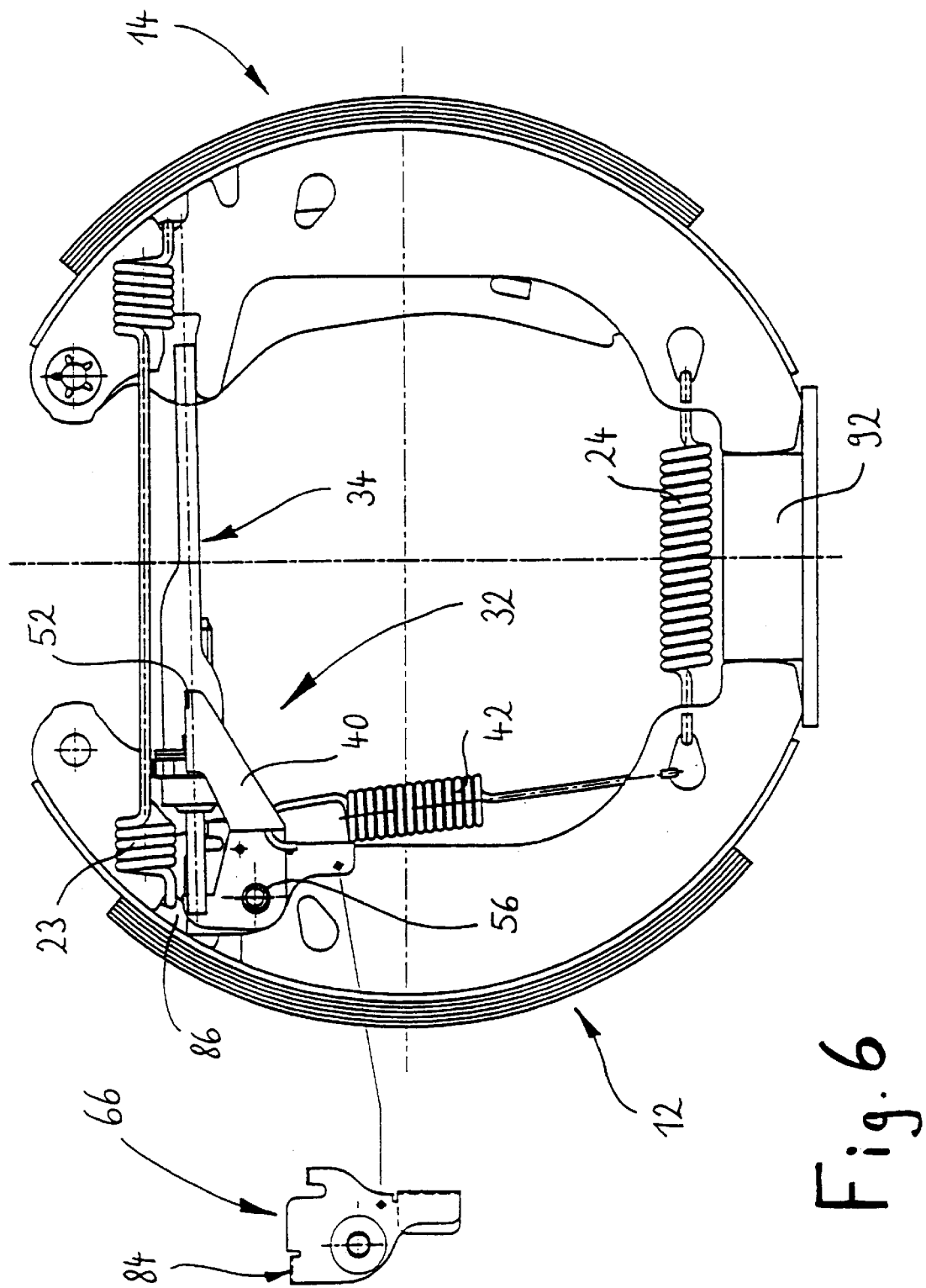
FIG. 6 shows a structural unit according to the invention with two brake shoes, an adjusting device and a brake shoe return spring.

FIG. 6 shows a structural unit for a drum brake, which consists of the two brake shoes 12 and 14, the adjusting strut 34, the adjusting lever 40, the two brake shoe holding down devices 36, the adjusting spring 42, the two brake shoe return springs 23 and 24, and the actuating lever 30. Such a structural unit is also separately marketed as a so-called repair kit. Instead of the counterbearing 25 which is provided in the drum brake, an intermediate piece 92 which for example is made of plastic material is placed between the two brake shoes 12 and 14 which provides for absorption of the force exerted by brake shoe return spring 24 shown lowermost in FIG. 6 so that the packaging of the illustrated structural unit during storage and marketing of such a structural unit is ensured.

What is claimed is:

1. A structural unit for a drum brake comprising:
   at least one brake shoe including a web having a recess provided therein; and
   an adjusting device having an adjusting strut, a ratchet-detent wheel mechanism, and an adjusting lever, said adjusting lever pivotally supported on said web of said brake shoe by a bearing pin, said bearing pin attached to a separate carrier member which is slid onto said web of said brake shoe in a clamping manner and which includes at least one first offset which is in positive engagement with said recess provided in said web of said brake shoe.

2. The structural unit according to claim 1 wherein said carrier member includes a plate-shaped base which rests on said web of said brake shoe and from which said bearing pin extends at right angles relative to said web.

3. The structural unit according to claim 2 wherein said plate-shaped base is formed about said opening as a truncated cone from a plane of said base away from said web of said brake shoe, with a diameter of said opening being slightly smaller than a diameter of said bearing pin.

4. The structural unit according to claim 3 wherein said bearing pin is constituted by a hollow steel rivet whose foot is arranged below said truncated cone-shaped form and in the plane of said plate shaped base.

5. The structural unit according to claim 4 wherein said carrier member includes a generally U-shaped section which is connected with said plate shaped base, can be slid onto said web of said brake shoe, and that said first offset is arranged remote from said U-shaped section.

6. The structural unit according to claim 5 wherein said U-shaped section includes two legs which extend in the same direction and are approximately parallel to each other and whose distance from each other in the area of a free end of at least one of said legs is smaller than a thickness of said web of said brake shoe.

7. The structural unit according to claim 6 wherein said at least one of said legs is part of said plate-shaped base of said carrier member.

8. The structural unit according to claim 1 wherein said carrier member includes a second offset which is directed in the opposite sense of said first offset for radial support of said adjusting strut.

9. The structural unit according to claim 8 wherein said carrier member is provided with a third offset which extends in generally the same sense as said second offset and is arranged adjacent to said second offset in such a manner that said second offset supports said adjusting strut at a radially inner position and said third offset supports said adjusting strut at a radially outer position.

10. The structural unit according to claim 1 wherein said carrier member consists of a spring-grade steel.

11. The structural unit according to claim 1 wherein said structural unit comprises two brake shoes between which two brake shoe return springs extend.

12. A structural unit for a drum brake comprising:
    at least one brake shoe including a web having a recess provided therein; and
    an adjusting device having an adjusting strut, a ratchet-detent wheel mechanism, and an adjusting lever, said adjusting lever pivotally supported on said web of said brake shoe by a bearing pin, said bearing pin attached to a separate carrier member which is slid onto said web of said brake shoe in a clamping manner and which includes at least one first offset which is in positive engagement with said recess provided in said web of said brake shoe, said carrier member includes a plate-shaped base which rests on said web of said brake shoe and from which said bearing pin extends at right angles relative to said web, said plate-shaped base includes an opening which accommodates said bearing pin, said plate-shaped base is formed about said opening as a truncated cone from a plane of said base away from said web of said brake shoe, with a diameter of said opening being slightly smaller than a diameter of said bearing pin.

13. The structural unit according to claim 12 wherein said bearing pin is constituted by a hollow steel rivet whose foot is arranged below said truncated cone-shaped form and in the plane of said plate shaped base.

14. The structural unit according to claim 13 wherein said carrier member includes a generally U-shaped section which is connected with said plate shaped base, can be slid onto said web of said brake shoe, and that said first offset is arranged remote from said U-shaped section.

15. The structural unit according to claim 14 wherein said U-shaped section includes two legs which extend in the same direction and are approximately parallel to each other and whose distance from each other in the area of a free end of at least one of said legs is smaller than a thickness of said web of said brake shoe.

16. The structural unit according to claim 15 wherein said at least one of said legs is part of said plate-shaped base of said carrier member.

17. The structural unit according to claim 12 wherein said carrier member includes a second offset which is directed in the opposite sense of said first offset for radial support of said adjusting strut.

18. The structural unit according to claim 17 wherein said carrier member is provided with a third offset which extends in generally the same sense as said second offset and is arranged adjacent to said second offset in such a manner that said second offset supports said adjusting strut at a radially inner position and said third offset supports said adjusting strut at a radially outer position.

19. The structural unit according to claim 12 wherein said carrier member consists of a spring-grade steel.

20. The structural unit according to claim 12 wherein said structural unit comprises two brake shoes between which two brake shoe return springs extend.

* * * * *